US012706420B2

(12) United States Patent
De Dios Martin et al.

(10) Patent No.: US 12,706,420 B2
(45) Date of Patent: Aug. 11, 2026

(54) CONNECTOR INCLUDING A DISENGAGEMENT FEATURE

(71) Applicants: CommScope Technologies LLC, Hickory, NC (US); CommScope Connectivity Spain, S.L., Alcobendas (ES); CommScope Connectivity Belgium BVBA, Kessel-Lo (BE)

(72) Inventors: Longinos De Dios Martin, Barcelona (ES); Danny Thijs, Zonhoven (BE); Sheldon Muir, Whitsett, NC (US)

(73) Assignees: CommScope Technologies LLC, Hickory, NC (US); CommScope Connectivity Spain, S.L., Alcobendas (ES); CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 18/785,520

(22) Filed: Jul. 26, 2024

(65) Prior Publication Data

US 2025/0030196 A1 Jan. 23, 2025

Related U.S. Application Data

(63) Continuation of application No. 18/349,676, filed on Jul. 10, 2023, now Pat. No. 12,088,044, which is a (Continued)

(30) Foreign Application Priority Data

Feb. 8, 2011 (ES) ................................ ES201130169

(51) Int. Cl.

| | |
|---|---|
| ***H01R 13/633*** | (2006.01) |
| ***H01R 24/64*** | (2011.01) |
| ***H01R 43/26*** | (2006.01) |

(52) U.S. Cl.

CPC ........... *H01R 13/633* (2013.01); *H01R 43/26* (2013.01); *H01R 24/64* (2013.01); *Y10T 29/49117* (2015.01)

(58) Field of Classification Search

CPC ...... H01R 13/633; H01R 43/26; H01R 24/64; Y10T 29/49117

See application file for complete search history.

(56) References Cited

U.S. PATENT DOCUMENTS 5,011,424 A 4/1991 Simmons
5,090,916 A 2/1992 Magnier
(Continued)

FOREIGN PATENT DOCUMENTS

CN 1658441 A 8/2005
CN 1770568 A 5/2006
(Continued)

OTHER PUBLICATIONS

Chinese Office Action dated May 22, 2015; CN Patent Appln. No. 201280017489.2; 7 pages.
(Continued)

*Primary Examiner* — Felix O Figueroa
(74) *Attorney, Agent, or Firm* — Merchant & Gould P.C.

(57) ABSTRACT

The invention relates to a connector (1) for data connections, in particular of the RJ type, with a latch element (6) for securing a connection to a counter-connector. In order to simplify a disconnection of the connector (1) and the counter-connector, even when the connection is secured by the latch connection, the invention provides that the connector (1) is provided with a gripping end (5, 5') that is adapted to transfer the latch element (6) from its latch position (L) and to disconnect the connector (1) from the counter-connector by a single movement.

17 Claims, 9 Drawing Sheets

Related U.S. Application Data continuation of application No. 17/734,757, filed on May 2, 2022, now Pat. No. 11,742,617, which is a continuation of application No. 15/677,524, filed on Aug. 15, 2017, now Pat. No. 11,322,889, which is a continuation of application No. 13/984,455, filed as application No. PCT/EP2012/052039 on Feb. 7, 2012, now Pat. No. 9,825,403.

(56) References Cited

U.S. PATENT DOCUMENTS

| | | | |
|---|---|---|---|
| 5,123,071 | A | 6/1992 | Mullholland et al. |
| 5,211,572 | A | 5/1993 | Comstock et al. |
| 5,315,679 | A | 5/1994 | Baldwin et al. |
| 5,335,301 | A | 8/1994 | Newman et al. |
| 5,462,457 | A | 10/1995 | Schroepfer et al. |
| 5,481,634 | A | 1/1996 | Anderson et al. |
| 5,574,812 | A | 11/1996 | Beier et al. |
| 5,579,425 | A | 11/1996 | Lampert et al. |
| 5,638,474 | A | 6/1997 | Lampert et al. |
| 5,651,690 | A | 7/1997 | Klas et al. |
| 5,675,682 | A | 10/1997 | De Marchi |
| 6,024,498 | A | 2/2000 | Carlisle et al. |
| 6,076,974 | A | 6/2000 | Carlisle et al. |
| 6,164,835 | A | 12/2000 | Imasaki |
| 6,196,733 | B1 | 3/2001 | Wild et al. |
| 6,250,817 | B1 | 6/2001 | Lampert et al. |
| 6,250,942 | B1 | 6/2001 | Lemke et al. |
| 6,254,418 | B1 | 7/2001 | Tharp et al. |
| 6,276,839 | B1 | 8/2001 | De Marchi |
| 6,325,547 | B1 | 12/2001 | Cammons |
| 6,357,934 | B1 | 3/2002 | Discoll |
| 6,435,732 | B1 | 8/2002 | Asad |
| 6,443,627 | B1 | 9/2002 | Anderson et al. |
| 6,447,170 | B1 | 9/2002 | Takahashi et al. |
| 6,692,289 | B2 | 2/2004 | Nemoto |
| 6,776,645 | B2 | 8/2004 | Roth et al. |
| 6,863,556 | B2 | 3/2005 | Viklund et al. |
| 6,885,560 | B2 | 4/2005 | Zaremba |
| 6,994,580 | B1 | 2/2006 | Chen et al. |
| 7,037,129 | B2 | 5/2006 | Lo et al. |
| 7,052,186 | B1 | 5/2006 | Bates |
| 7,101,212 | B1 | 9/2006 | Larkin |
| 7,163,414 | B2 | 1/2007 | Lo et al. |
| 7,281,856 | B2 | 10/2007 | Grzegorzewska et al. |
| 7,281,938 | B1 | 10/2007 | Wu |
| 7,297,013 | B2 | 11/2007 | Caveney et al. |
| 7,326,075 | B1 | 2/2008 | Armstrong et al. |
| 7,329,137 | B2 | 2/2008 | Martin et al. |
| 7,354,292 | B1 | 4/2008 | Lloyd et al. |
| 7,413,473 | B2 | 8/2008 | Wu |
| 7,421,181 | B2 | 9/2008 | Kanou et al. |
| 7,425,159 | B2 | 9/2008 | Lin |
| 7,440,670 | B2 | 10/2008 | Kanou et al. |
| 7,445,484 | B2 | 11/2008 | Wu |
| 7,465,180 | B2 | 12/2008 | Kusada et al. |
| 7,534,125 | B1 | 5/2009 | Schroll |
| 7,534,128 | B2 | 5/2009 | Caveney et al. |
| 7,537,393 | B2 | 5/2009 | Anderson et al. |
| 7,549,888 | B1 | 6/2009 | Armstrong et al. |
| 7,572,065 | B2 | 8/2009 | Lu et al. |
| 7,588,373 | B1 | 9/2009 | Sato et al. |
| 7,594,766 | B1 | 9/2009 | Sasser et al. |
| 7,632,125 | B2 | 12/2009 | Irwin et al. |
| 7,641,398 | B2 | 1/2010 | O'Riorden et al. |
| 7,651,361 | B2 | 1/2010 | Henry et al. |
| 7,666,023 | B2 | 2/2010 | Wu |
| 7,690,939 | B2 | 4/2010 | Wu |
| 7,736,171 | B2 | 6/2010 | Reed et al. |
| 7,753,710 | B2 | 7/2010 | George |
| 7,771,225 | B1 | 8/2010 | Wu |
| 7,892,012 | B1 | 2/2011 | Foung |
| 8,109,679 | B2 | 2/2012 | Danley et al. |
| 8,152,384 | B2 | 4/2012 | De Jong et al. |
| 8,152,385 | B2 | 4/2012 | De Jong et al. |
| 8,187,018 | B2 | 5/2012 | Kosugi |
| 8,221,007 | B2 | 7/2012 | Peterhans et al. |
| 8,235,745 | B1 | 8/2012 | Armstrong et al. |
| 8,267,712 | B2 | 9/2012 | Huang et al. |
| 8,317,406 | B2 | 11/2012 | Tamekuni et al. |
| 8,317,532 | B2 | 11/2012 | Kosugi |
| 8,382,506 | B2 | 2/2013 | Reed et al. |
| 8,465,317 | B2 | 6/2013 | Giniadek et al. |
| 8,556,645 | B2 | 10/2013 | Crain |
| 8,559,781 | B2 | 10/2013 | Childers et al. |
| 8,646,989 | B2 | 2/2014 | Zimmel et al. |
| 8,678,669 | B2 | 3/2014 | Lee |
| 8,690,593 | B2 | 4/2014 | Anderson et al. |
| 8,702,323 | B2 | 4/2014 | Nhep |
| 8,747,141 | B2 | 6/2014 | Crain |
| 8,764,308 | B2 | 7/2014 | Irwin et al. |
| 8,821,034 | B2 | 9/2014 | Kwasny |
| 8,840,320 | B2 | 9/2014 | Park et al. |
| 8,864,390 | B2 | 10/2014 | Chen et al. |
| 8,870,466 | B2 | 10/2014 | Lu |
| 8,876,403 | B2 | 11/2014 | Katoh |
| 8,979,569 | B2 | 3/2015 | Aekins |
| 9,063,296 | B2 | 6/2015 | Dong et al. |
| 9,140,858 | B2 | 9/2015 | Xiong et al. |
| 9,158,076 | B2 | 10/2015 | Guo et al. |
| 9,500,816 | B2 | 11/2016 | Lu |
| 9,557,495 | B2 | 1/2017 | Raven et al. |
| 9,563,024 | B2 | 2/2017 | Zhong et al. |
| 9,570,852 | B2 | 2/2017 | Plamondon et al. |
| 9,638,871 | B2 | 5/2017 | Bund et al. |
| 9,825,043 | B2 * | 11/2017 | Colinge ............... H10B 10/125 |
| 9,864,151 | B2 | 1/2018 | Lu |
| 10,598,865 | B2 | 3/2020 | Ott |
| 10,746,939 | B2 | 8/2020 | Lu et al. |
| 11,322,889 | B2 | 5/2022 | De Dios Martin et al. |
| 11,742,617 | B2 | 8/2023 | De Dios Martin et al. |
| 11,782,224 | B2 | 10/2023 | Nhep |
| 12,088,044 | B2 | 9/2024 | De Dios Martin et al. |
| 2002/0090177 | A1 | 7/2002 | Anderson |
| 2003/0017729 | A1 | 1/2003 | Huang |
| 2003/0147598 | A1 | 8/2003 | McPhee et al. |
| 2003/0220008 | A1 | 11/2003 | Viklund et al. |
| 2003/0220080 | A1 | 11/2003 | Chuberre et al. |
| 2003/0220081 | A1 | 11/2003 | Dykstra et al. |
| 2003/0220082 | A1 | 11/2003 | Yoshida |
| 2003/0220083 | A1 | 11/2003 | Lee et al. |
| 2003/0220084 | A1 | 11/2003 | Makarov et al. |
| 2003/0220085 | A1 | 11/2003 | Kawand |
| 2003/0220086 | A1 | 11/2003 | Birkett |
| 2003/0220087 | A1 | 11/2003 | Suhonen |
| 2003/0220088 | A1 | 11/2003 | Cowley et al. |
| 2003/0220089 | A1 | 11/2003 | Chang et al. |
| 2003/0222008 | A1 | 12/2003 | Nightlinger et al. |
| 2004/0247252 | A1 | 12/2004 | Ehrenreigh |
| 2005/0054230 | A1 | 3/2005 | Huang |
| 2005/0058404 | A1 | 3/2005 | Ngo |
| 2005/0124201 | A1 | 6/2005 | Lo et al. |
| 2006/0049826 | A1 | 3/2006 | Daneman et al. |
| 2006/0089039 | A1 | 4/2006 | Caveney |
| 2006/0276071 | A1 | 12/2006 | Rossi |
| 2007/0049082 | A1 | 3/2007 | Wu |
| 2007/0077806 | A1 | 4/2007 | Martin et al. |
| 2007/0140621 | A1 | 6/2007 | Decusatis et al. |
| 2007/0232118 | A1 | 10/2007 | Wu |
| 2007/0298636 | A1 | 12/2007 | Kusada et al. |
| 2008/0030220 | A1 | 2/2008 | Agarwal et al. |
| 2008/0226237 | A1 | 9/2008 | O'Riorden et al. |
| 2009/0042424 | A1 | 2/2009 | Kaneda |
| 2009/0047818 | A1 | 2/2009 | Irwin et al. |
| 2009/0245732 | A1 | 10/2009 | Murano |
| 2010/0216325 | A1 | 8/2010 | Huang |
| 2010/0220961 | A1 | 9/2010 | De Jong et al. |
| 2011/0058773 | A1 | 3/2011 | Peterhans et al. |
| 2011/0081113 | A1 | 4/2011 | Jones |
| 2011/0091159 | A1 | 4/2011 | De Jong et al. |
| 2011/0183541 | A1 | 7/2011 | Kosugi |
| 2011/0217008 | A1 | 9/2011 | Cline et al. |
| 2011/0299814 | A1 | 12/2011 | Nakagawa |
| 2012/0057826 | A1 | 3/2012 | Katoh |

(56) References Cited

U.S. PATENT DOCUMENTS

| | | | |
|---|---|---|---|
| 2012/0141074 A1 | 6/2012 | Sabo | |
| 2012/0155810 A1 | 6/2012 | Nakagawa | |
| 2012/0208388 A1 | 8/2012 | Kosugi | |
| 2012/0213478 A1 | 8/2012 | Chen et al. | |
| 2012/0308183 A1 | 12/2012 | Irwin et al. | |
| 2013/0115794 A1 | 5/2013 | Chang et al. | |
| 2013/0163934 A1 | 6/2013 | Lee et al. | |
| 2013/0301994 A1 | 11/2013 | Motofuji | |
| 2013/0323949 A1 | 12/2013 | De Dios Martin et al. | |
| 2014/0141641 A1 | 5/2014 | De Dios Martin et al. | |
| 2014/0169727 A1 | 6/2014 | Veatch et al. | |
| 2015/0003788 A1* | 1/2015 | Chen ...................... | G02B 6/387 385/72 |
| 2016/0116685 A1 | 4/2016 | Wong et al. | |
| 2016/0356962 A1 | 12/2016 | Moriyama et al. | |
| 2017/0031109 A1 | 2/2017 | Meadowcroft et al. | |

FOREIGN PATENT DOCUMENTS

| | | | |
|---|---|---|---|
| CN | 101065888 | A | 10/2007 |
| CN | 101133524 | A | 2/2008 |
| CN | 101160696 | A | 4/2008 |
| CN | 101313441 | A | 11/2008 |
| CN | 102365568 | A | 2/2012 |
| CN | 103091793 | A | 5/2013 |
| EP | 1271706 | A2 | 1/2003 |
| EP | 1653566 | A1 | 5/2006 |
| EP | 1855360 | A1 | 11/2007 |
| EP | 2063497 | A1 | 5/2009 |
| EP | 2144100 | A1 | 1/2010 |
| EP | 2337163 | A1 | 6/2011 |
| JP | S63-184271 | A | 7/1988 |
| JP | 2003-526116 | A | 9/2003 |
| WO | 2004/065999 | A2 | 8/2004 |
| WO | 2005/041363 | A1 | 5/2005 |
| WO | 2006/047258 | A1 | 5/2006 |
| WO | 2007/044310 | A1 | 4/2007 |
| WO | 2009/135787 | A1 | 11/2009 |
| WO | 2010/038283 | A1 | 4/2010 |
| WO | 2012/054174 | A1 | 8/2012 |
| WO | 2012/107439 | A1 | 8/2012 |
| WO | 2012/107441 | A1 | 8/2012 |
| WO | 2012/151175 | A2 | 11/2012 |
| WO | 2013/124785 | A1 | 5/2013 |
| WO | 2015/103783 | A1 | 7/2015 |

OTHER PUBLICATIONS

Chinese Office Action dated Jun. 18, 2015; CN Patent Appln. No. 201280017445.X; 5 pages.

Extended European Search Report for European Patent Application No. 14878059.6 mailed Aug. 9, 2017, 10 pages.

International Search Report for International Application No. PCT/EP2012/052036 mailed Mar. 22, 2012. (2 pages).

International Search Report for International Application No. PCT/EP2012/052039 mailed May 31, 2012. (3 pages).

International Search Report for International Application No. PCT/IB2013/051329 mailed Jun. 13, 2013 (2 pages).

International Written Opinion for International Application No. PCT/IB2013/051329 mailed Jun. 13, 2013 (7 pages).

Spanish Search Report for corresponding application No. ES 201130169 mailed May 24, 2013 (with English Translation), 10 pages.

Spanish Search Report for application No. ES 201130168 mailed Jul. 1, 2013 (with English Translation); 8 pages.

* cited by examiner

CONNECTOR INCLUDING A DISENGAGEMENT FEATURE

This application is a continuation of U.S. patent application Ser. No. 18/349,676, filed Jul. 10, 2023, now U.S. Pat. No. 12,088,044, which is a continuation of U.S. patent application Ser. No. 17/734,757, filed on May 2, 2022, now U.S. Pat. No. 11,742,617, which is a continuation of U.S. patent application Ser. No. 15/677,524, filed Aug. 15, 2017, now U.S. Pat. No. 11,322,889, which is a continuation of U.S. patent application Ser. No. 13/984,455, filed Feb. 7, 2014, now U.S. Pat. No. 9,825,403, which is a National Stage Application of PCT/EP2012/052039, filed Feb. 7, 2012, which claims benefit of Serial No. P201130169, filed Feb. 8, 2011 in Spain and which applications are incorporated herein by reference. To the extent appropriate, a claim of priority is made to each of the above disclosed applications.

The present invention relates to a connector for data connections in particular of the RJ type, the connector being adapted to be connected to a counter-connector in a contact direction, the connector having a housing, the housing including a contact end pointing in the contact direction and a gripping end opposite the contact end, and having a latch element for securing the connection between the connector and the counter-connector in its latch position.

Connectors of the above-mentioned type are well known in the art. In particular, when many connectors are to be connected to a patch field, for instance when connecting many telephones or computers to a central apparatus, connectors connected to counter-connectors are arranged with a high density. Due to the high density arrangement, it may be complicated for an operator to reach the latch element with his fingers, as the finger for operating the latch element may have to be placed between two connectors.

In view of these disadvantages of the known electrical connectors, an object underlying the invention is to provide electrical connectors, which can easily be removed from a counter-connector, especially when many connectors are arranged in a high density connected state.

For the connector for data connections mentioned above, the object is achieved according to the invention in that the gripping end is adapted to be slid relative to the contact end against the contact direction into a release position and is operatingly connected to the latch element, which, in the release position of the gripping end, is arranged in an unlatch position spaced apart from its latch position in an unlatch direction.

This simple solution provides that for operating the latch element, the operator can easily grip the gripping end. The gripping end of the contact is easily accessible and no finger has to be pushed between connectors for removing the latch element from its latch position. A latch connection between the connector and the counter-connector can be released and the connector can be removed from the counter-connector with a single action, namely by pulling the gripping end against the contact direction.

The solution according to the invention can be combined as desired and further improved by the further following embodiments that are advantageous on their own, in each case.

According to a first possible embodiment, the connector can be provided with a conversion element that is connected to the gripping end in a motion-transmitting manner. The conversion element may be adapted to convert a sliding release motion of the gripping end in a release direction into an unlatch motion of the latch element in the unlatch direction. Hence, the conversion element enables that a motion, which is usually blocked by a latch connection between the latch element and counter-latch element of the counter-connector, results in releasing the latch connection. As only movements of the gripping end result in the unlatch action, forces that are introduced e.g. via a cable do not influence the latch connection.

For instance, the gripping end may be adapted to be moved relative to the contact end in the release direction, which may be the opposite direction to the contact direction. When moving the gripping end in the release direction, the gripping end pulls at least a connection section of the conversion element in the release direction and a pressing section of the conversion element presses the latch element in the unlatch direction towards the housing. By pressing the latch element towards the housing, in particular, a latch section as well as a free end of the latch element, may be moved in the unlatch direction towards the housing. Hence, by moving the gripping end in the release direction against the contact direction, the latch connection between the connector and the counter-connector may be released. The movement of the gripping end may be described as a sliding motion.

The release motion of the release element and the resulting convertion motion of at least a part of the conversion element may differ in direction and/or character. For instance, the release motion may be translatory motion in a release direction that points against the contact direction. The conversion element can for instance have a converting motion that equals the sliding release motion of the gripping end. Due to this relation of the release motion and the converting motion, the motion-transmitting connection between the conversion element and the gripping end can be easy and the conversion element can e.g. be affixed to the gripping end. Furthermore, the conversion element may have a converting motion, that is a rotatory motion. For instance, the conversion element may be provided with a rocking lever, which transforms the sliding motion of the gripping end into a rotatory motion of the conversion element. The connection section of the rocking lever may be shaped with a connection leg interconnecting the conversion element and the gripping end. By using a lever, the forces that are introduced into the gripping end can effectively be redirected due to a lever ratio of the connection leg and the pressing section of the conversion element.

The pressing section can interact with the latch element and in particular with its free end, assuring that the latch element can be removed from its latch position by relatively low forces. The pressing section may at least sectionwise overlap the latch element and can be formed with a pressing ramp. The pressing ramp can be slanted with respect to the contact direction and can, in its release position, force the latch element out of the latch position. In particular, if the converting motion is a sliding motion, such a pressing section can easily remove the latch element from its latch position. For instance, the pressing section may be closer to a housing body of the connector than the free end of the latch element. When the pressing section is moved in the release direction towards the free end, it presses the free end towards the housing body out of its latch position. Due to the slanted arrangement of the connection ramp, the pressing section can abut against the latch element in a large area, avoiding isolated and small mechanical pressures.

The conversion element may be formed with a kink or elbow, from which the connection section and the pressing section may extend in different directions. Such a kink may further improve the extent of displacement of the latch element caused by the conversion element, especially when the converting motion is a sliding motion. If the converting motion is a rotatory motion, a rotatory axis may extend through the kink, optimising lever arrangement and the size of the conversion element.

The connector may comprise a guiding element, which may be immovably connected to the contact end of the housing and to the housing body, respectively. The guiding element may guide the release motion of the gripping end. A guided release motion prevents that the operator unintentionally jams the gripping end and assures that the forces are conveyed along intended paths. Additionally or alternatively, the guiding element may guide the converting movement of the conversion element. This ensures that the conversion element always interacts with the gripping end and also the latch element, even if the latch element is shaped with a latch cam or locking lever that may be relatively small.

The guiding element may form a longitudinal guidance, thereby guiding sliding converting motions. Additionally or alternatively, the guiding element may provide for a pivot bearing allowing for stable rotatory converting motions.

The longitudinal guidance can comprise a guiding groove, in which a guiding protrusion may slide. The pivot bearing may be shaped as an opening in the guiding element. Such a pivot bearing can be easily produced by punching or by injection molding. The connection section of the conversion element can at least sectionwise be accommodated in the opening in a swivelling manner. Hence, no additional parts may be necessary for the guidance of the rotatory converting motion. Furthermore, the pivot bearing can be shaped with a bearing groove, which extends along a rotational axis of the conversion element and in which a bearing bar can be guided in a rotatory manner.

In order to make sure that the gripping end remains or returns in an operation position, in which the latch may be arranged in its latch position, the connector can comprise a resilient return means. The resilient return means can automatically transfer the gripping end from its release position to its operating or home position. In the release position, the latch element is held in the unlatch position. In the home or operating position, the latch element can be arranged in the latch position and can in particular form the latch connection with the counter latch element. The home or operating position of the gripping end may be arranged forward of the release position in the contact direction.

The gripping end may be formed as a separate slider boot of the housing, via which a cable can enter the connector. The gripping end may guide the cable without being attached to it. Hence, forces that act in the release direction onto the cable do not result in a release motion of the gripping end.

A housing with a separate gripping end can easily be produced and assembled. By arranging the cable in the gripping end, the cable may be protected against excessive bending. Hence, the housing may comprise at least the housing body, the conversion element and the gripping end. Furthermore, the housing may comprise the guiding element, which can be fixed to the housing body.

The conversion element may be provided with a stop, which blocks further movements of the conversion element in the release direction beyond its release position. Via this stop, forces necessary for removing the connector from the counter-connector in the unlatched state may be transmitted from the gripping end into the body of the housing.

When using a conversion element with a rotatory converting motion, a separate stop for moving the complete connector after unlatching may not be necessary. When pulling the gripping end in the release direction, the motion of the gripping end is transformed into the unlatch position by the conversion element. As soon as the latch element has reached its unlatch position, it can block a further rotation of the conversion element. Thus, further moving the gripping end in the release direction does not result in a further rotatory movement of the conversion element but to a removal of the connector from the counter-connector.

In a further advantageous embodiment, the gripping end may end against the contact direction in an insertion end with an insertion opening, via which the cable may enter the connector. The insertion opening may be closed perpendicular to the contact direction and may for instance have a circular footprint. The insertion end may have ring-like shape and can surround the insertion opening.

In a further advantageous embodiment, the gripping end may have a concave contour, improving the gripping stability of the fingers. The actuating part may have a width perpendicular to the contact direction, which may vary in the contact direction. For instance, starting from the insertion end, the width may first decrease until it reaches a minimum value and may afterwards at least sectionwise increase again. A section of the actuating part with the minimal width may be shaped as a waist, the waist improving the contact between the fingers of the operator and the gripping end.

The gripping end may comprise a funnel-shaped inlet section, via which the cable may enter the connector. The funnel-shape of the inlet section eases the introduction of the cable into the connector and in addition avoids that the cable is overbent or bent over sharp borders when the connector is pivoted with respect to the cable.

In the contact direction, a cable acceptance may follow the insertion opening. The cable acceptance may have a tunnel-shape and may extend at least through the gripping end in the contact direction. An inner diameter of the cable acceptance may transverse to the contact direction always be larger than a diameter of the cable. Hence, the gripping end can easily be slid in and against the contact direction without holding on or to the cable. The cable acceptance can open into the insertion end against the contact direction and may open under an angle, which may represent angles that are larger than 0° and smaller than 180° and which may in particular be between 5° and 20° or up to 40°.

In a further advantageous embodiment, the connector may comprise an auxiliary gripping means. The auxiliary gripping means can alternatively by a spare part or part of a kit with more than one connector and at least one auxiliary gripping means. The auxiliary gripping means may be used with a connector independent of the shape of the conversion element. This gripping means can improve accessibility of the gripping end, which can be slid by pulling the auxiliary gripping means against the contact direction.

The gripping means may be shaped as a tongue of flap. The gripping tongue or flap may also be used as a label, which can indicate the type of connection that is established between the connector and the counter-connector. Other information, e.g. IP-addresses or other data may be shown on the gripping tongue or flap.

The gripping means may comprise a free end, which points against the contact direction. The free end can extend so far beyond the gripping end that it can be easily read and/or gripped by the operator.

In the contact direction opposite to the free end, the auxiliary gripping means may be formed with a fixation end, which can be affixed to the gripping end. For instance, the fixation end may be an integral part of the gripping end and may be produced together with the gripping end by an injection molding process. Alternatively, the auxiliary gripping means may be formed as a separate part and may be attached to the gripping end. For instance, the fixation end may be glued to the gripping end. If the auxiliary gripping means has to be connected to the gripping end to be removable, it may also be connected to the gripping end by a form- or force-fit. For instance, the fixation end may be hooked into openings of the gripping end that open away from the connector and perpendicular to the contact direction. The openings may increase the flexibility of the actuating part such that it can bend with the cable.

The free end may comprise at least one fixation element, via which it can be affixed to the gripping end. The gripping means may be shaped with two fixation elements, which protrude from a bottom side of the tongue-shaped gripping means, which faces the gripping end when the gripping means is mounted. The fixation elements extend transverse to the contact direction and can be formed with a button head at their free ends. The fixation elements and at least their free ends can be introduced in at least one opening of the gripping and may be pressed into the opening in order to affix the gripping means to the gripping end.

Alternatively to the flap-like shape described above, the auxiliary gripping means may according to a further possible embodiment essentially be shaped with as a rod-shaped middle part that extends along the contact direction and interconnects its ends. Against the contact direction, the rod may end in the free end.

Independent of the shape of the middle part, the free end may be shaped as a cable acceptance means which assures that the cable enters the connector without being bent. Therefore, the free end and the insertion opening may be aligned along the contact direction. In particular, the free end may be shaped as a ring, whose centre is aligned with a centre of the insertion opening. Holding the cable straight in the area of the connector improves slidability of the gripping end.

In order to make the design and the production of the auxiliary gripping means easier, at least the middle part, which can be of the flap-like or rod-like shape, can be flexible. Such an auxiliary gripping means can be a plastic part and can therefore be produced at low cost. A free end of an least sectionwise flexible auxiliary gripping means may move with the cable and relative to the contact end. Hence, removing the connector can be done by simply selecting the cable to be removed and by gripping and pulling on the free end attached to the cable. As the free end is affixed to the cable, it is sufficient for the user to identify the cable which shall be disconnected. As soon as the user has identified the cable, he easily recognizes the auxiliary gripping means belonging to this cable, which he then can grip and pull against the contact direction for unlatching and removing the connector from the counter connector. As the free end of the auxiliary gripping means may be arranged at a distance to the connector end, it can easily by gripped, even if the connector is together with many other connectors connected to a dense array of counter connectors.

According to a further possible embodiment, the gripping means may be formed with a fixation end, which can be releasably connected to the gripping end. For instance, the fixation end may have a U-shape, such that it is formed as a clamp or shackle. The fixation end may be positioned on the gripping end perpendicular to the contact direction. A minimum distance between straight parts of the U-shaped fixation end may be adapted to the width of the waist of the actuating part. The straight parts of the U-shaped fixation end may be arranged parallel to each other or with their free ends pointing away from each other.

Between the fixation end and a free end of the gripping means, the auxiliary gripping means may again have a rod-shape or a tongue-shape and the free end may have a ring-shape.

Independent of the shape of the fixation end, the ring may extend parallel to the contact direction. Hence, the free end may be used for directing the cable e.g. perpendicular to the contact direction after it has left the connector, still holding it straight in the area of the gripping end.

If the fixation end has the U-shape, the gripping means can easily be removed from the connector, e.g. to be attached to another connector. Hence guiding the cable through the ring-shaped free end would possibly not be useful. The chosen shape of the free end can be easily gripped by the operator and a finger of the operator may be inserted into the ring for pulling on the gripping end.

The described embodiments of the connector can intuitively be used by any operator familiar with known connectors, as the latch connection between the connector and the counter-connector can not only be opened by sliding the gripping end, but also by simply pressing the latch element from its latch position to its unlatch position. When having a connector with a sliding conversion element, at least the free end of the latch element can directly be accessed and/or pushed in the unlatch direction. If the connector comprises a conversion element with a rotatory conversion motion, the operator can simply force the pressing section of the conversion element towards the housing body, thereby displacing the latch element out of its position.

The invention is described hereinafter in greater detail and in an exemplary manner using advantages embodiments and with reference to the drawings. The described embodiments are only possible configurations in which, however, the individual features as described above can be provided independently of one another or can be omitted in the drawings.

Figure 1:
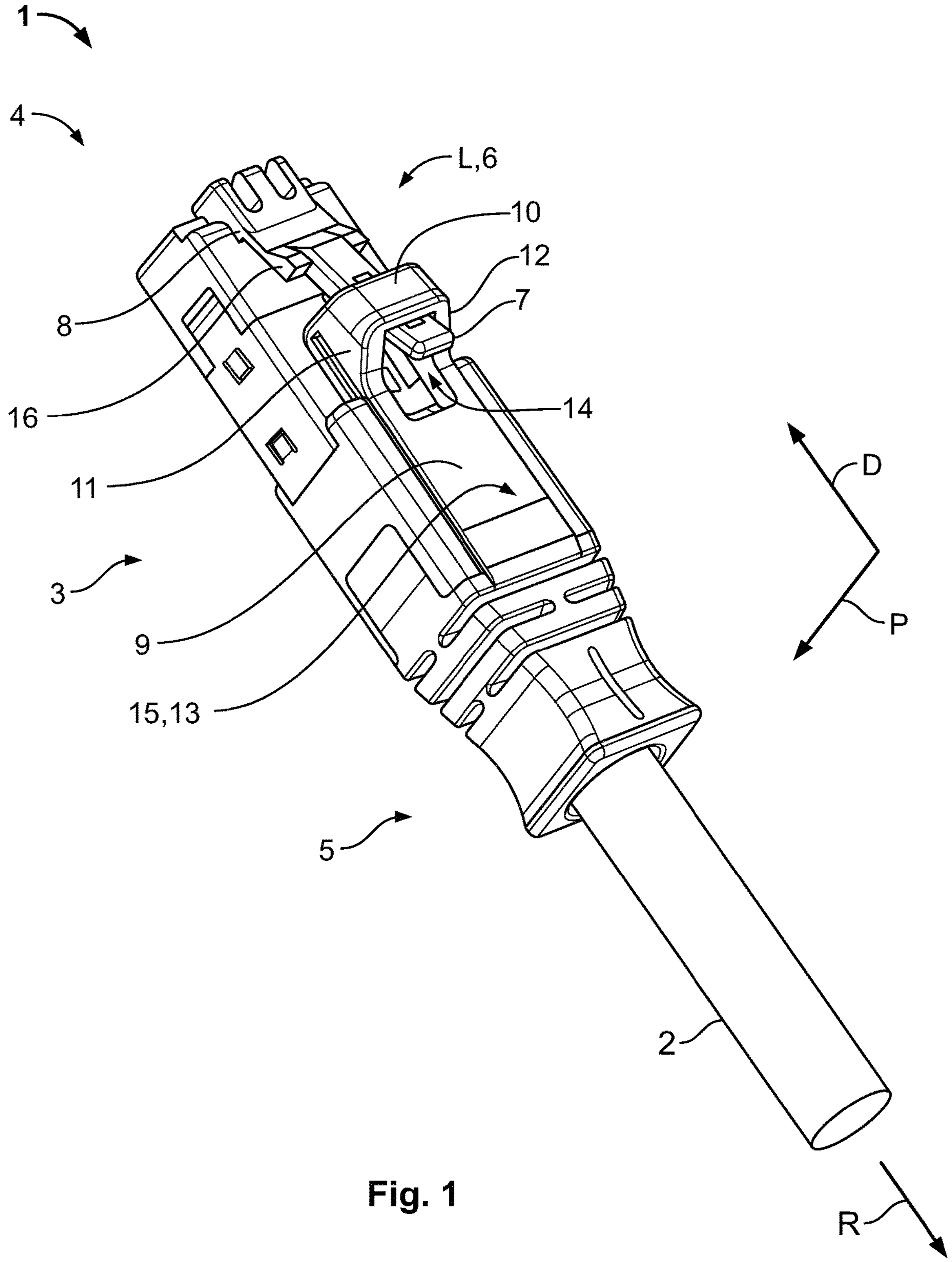
FIG. 1 is a schematic perspective view of a first exemplary embodiment of the invention.

First, a connector 1 attached to a cable 2 will be described with reference to FIG. 1. The connector 1 can be of the RJ type and can for instance be used for data or voice network connections. The connector 1 can comprise a housing 3 that at least partially surrounds electrical contact elements of the connector 1 and that is accessible from the outside of the connector 1. The housing 3 may be provided with a contact end 4 that points in a contact direction D. In the contact direction D opposite the contact end 4, the housing 3 may comprise a gripping end 5, which may be gripped by an operator when the connector 1 is connected to or unconnected from a counter-connector. Via the gripping end 5, the cable 2 may enter the connector 1. The connector 1 may furthermore comprise a latch element 6, which may protrude from the housing 3 transverse to the contact direction D and which may extend against the contact direction D. The latch element 6 may for instance be a locking lever or latch cam, whose free end 7 points against the contact direction D and whose end 8 opposite the free end 7 is attached to the housing 3 and in particular to its contact end 4.

The connector 1 may furthermore comprise a conversion element 9, which at least sectionwise may overlap the latch element 6 transverse to the contact direction D. In particular, a part of the conversion element 9 may overlap a section of the latch element 6 when the connector 1 is viewed perpendicular to the contact direction D. This overlapping section may be a pressing section 10 of the conversion element 9. The pressing section 10 may essentially extend along the contact direction D and may be flanked by at least one and maybe two side walls 11, 12 of the conversion element 9, which extend from the housing 3 towards the pressing section 10, and to which the pressing section 10 is attached.

The side walls 11, 12 may be based on a base plate 13 which may lie on the housing 3. The pressing section 10 together with the side walls 11, 12 and the base plate 13 can confine a conversion tunnel 14 in which at least a section of the latch element 6 may be arranged. In particular, the free end 7 of the latch element 6 may protrude from the conversion tunnel 14 against the contact direction D in a latch position L of the latch element 6 and an operating position of the gripping end 5. The conversion element 9 may be formed with a connection section 15, which extends away from the conversion tunnel 14 against the contact direction D and which may be connected to the gripping end 5 in a motion-transmitting manner.

In the exemplary embodiment of FIG. 1, the latch element 6 is shown in its latch position L. For unlatching the latch element 6 at least its free end 7 may be moved from the position L in an unlatch direction P towards a body of the housing. In the latch position L, the latch element 6 may interact with a counter latch element of the counter-connector, protecting the connection of the connector and a counter-connector by the latch connection. The latch element 6 may abut against the pressing section 10 in the latch position L.

The gripping end 5 may be adapted to be moved relative to the contact end 4 in a release direction R, which may be the opposite direction to the contact direction D. When moving the gripping end 5 in the release direction R, the gripping end 5 pulls at least the connection section 15 of the conversion element 9 in the release direction R and the pressing section 10 slides on the latch element 6, thereby pressing the latch element 6 in an unlatch direction P towards the housing 3. By pressing the latch element 6 towards the housing 3, in particular, a latch section 16 as well as the free end 7 of the latch element 6, are moved in the unlatch direction P towards the housing. Hence, by moving the gripping end 5 in the release direction R against the contact direction D, the latch connection between the connector 1 and the counter-connector may be released. The movement of the gripping end 5 may be described as a sliding motion.

Figure 2:
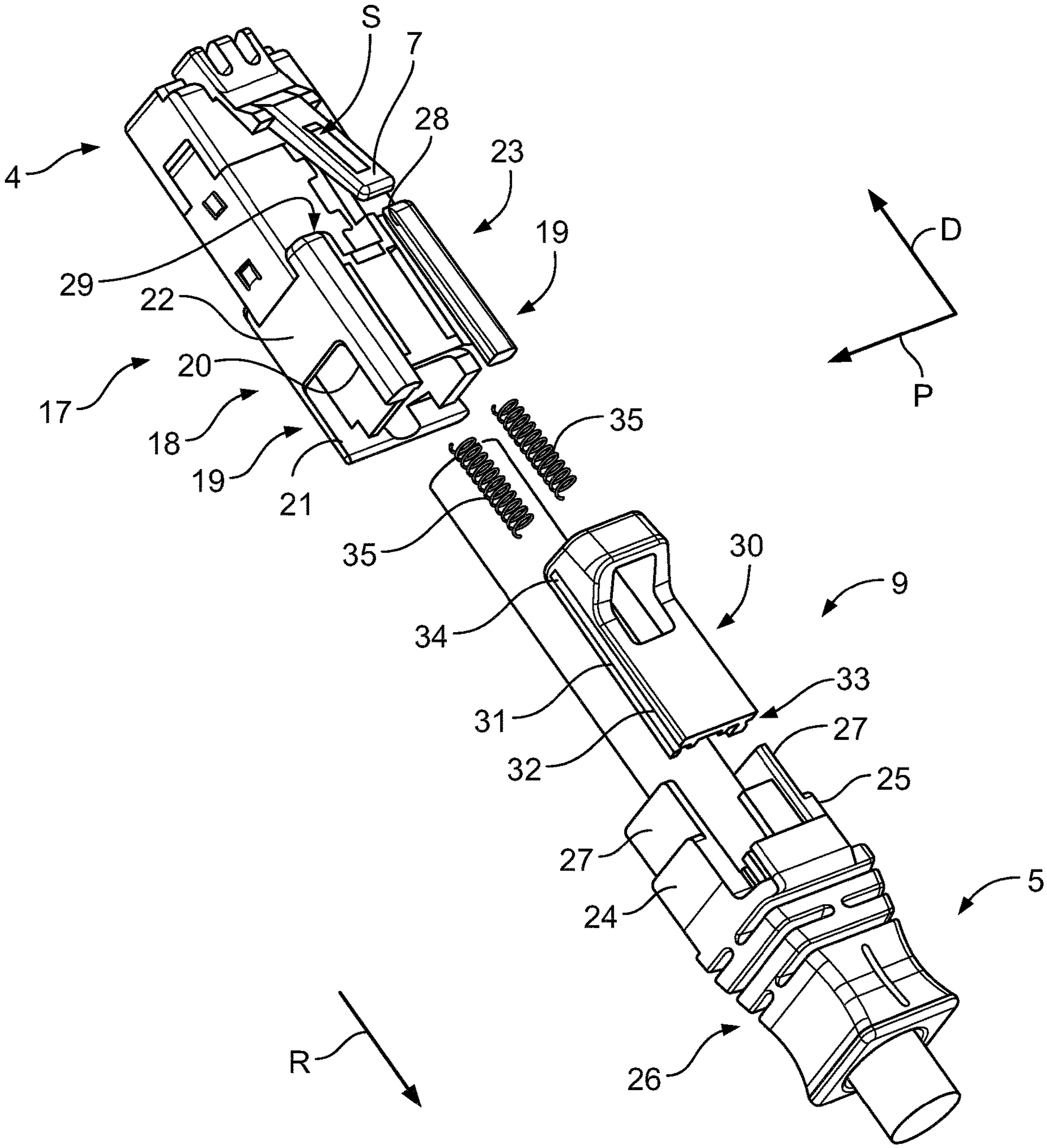
FIG. 2 is a schematic perspective exploded view of the exemplary embodiment of FIG. 1.

FIG. 2 shows the exemplary embodiment of FIG. 1 in schematic perspective exploded view.

As can be seen in FIG. 2, the housing 3 may comprise at least the gripping end 5 and a housing body 17. A further part of the housing 3 may be a guiding element 18, which may be immoveable with respect to the contact end 4 and which may be affixed to the housing body 17. Moreover, the conversion element 9 may be part of the housing 3.

The guiding element 18 may guide the release motion of the gripping end 5 in and against the release direction R, such that the release motion of the gripping end 5 may be described as a sliding motion. The guiding element 18 may be formed with at least one guiding bay 19, which opens against the contact direction D. The guiding bay 19 may be flanked by guiding legs 20, 21, which extend parallel to the release direction R and which guide the gripping end 5 during its release motion. In particular, the guiding element 18 may be provided with two guiding bays 19, which are arranged parallel and offset relative to one another. For example, the guiding bays 19 may be provided in side walls 22, 23 of the guiding element 18, the side walls 22, 23 extending in the contact direction D and the unlatch direction P.

The gripping end 5 may be shaped with at least one guiding protrusion 24, which is at least sectionwise shaped complementary to the guiding bay 19. The guiding protrusion 24 may project against the release direction R from an actuating part 26 of the gripping end 5. The actuating part 26 may be adapted to be gripped by an operator. Additionally, the gripping end 5 and in particular, the actuating part 26 may be adapted to act as a bend protection for the cable 2. If more than one guiding bay 19 is provided in the guiding element 18, the gripping end 5 may be provided with up to the same amount of guiding protrusions 24. In the shown embodiment, the gripping end 5 is provided with two guiding protrusions 24, 25.

The gripping end 5 may be shaped with at least one guiding plate 27, which extends in the contact direction D and the unlatch direction P. The guiding plate 27 may protrude from the guiding protrusion 24 in the contact direction D. It may rest against or slide on the side wall 22 and in particular against an inner side of the side wall 22. Again, the gripping end 5 may be shaped with more than one guiding plate 27 if necessary for the aspired guiding.

Via the guiding protrusion 24 and the guiding bay 19 and in combination with the guiding plate 27, unwanted movements of the gripping end 5 in or against the unlatch direction P can be avoided in order to be able to guide the release motion of the gripping end 5 and to assure that the gripping end 5 does essentially not move perpendicular to the release direction R.

Alternatively or additionally, the guiding element 18 may guide the converting motion or movement of the conversion element 9. In the embodiment of FIG. 2, the guiding element 18 provides for a longitudinal guidance for the conversion element 9. The longitudinal guidance may be provided by a guidance bar 28, which extends parallel to the release direction R and projects transverse to the release direction R and the unlatch direction P. In particular, the guiding element 18 may be formed with two guidance bars 28, 29, which are arranged opposite to each other and which protrude towards each other. The conversion element 9 may be formed with at least one guidance groove 30 for accepting the at least one guidance bar 28. Again, the amount of guidance bars 28, 29 and guidance grooves 30, 31 can be equal and each of the guidance grooves 30, 31 can be arranged to accept a guidance bar 28, 29 at least sectionwise.

In the embodiment of FIG. 2, guidance grooves 30, 31 are shaped with open ends 32, 33 pointing against the contact direction D and away from the pressing section 10. Hence, the conversion element 9 can be pushed onto the guidance bars 28, 29 against the contact direction D or in the release direction R. The conversion element 9 may be provided with a stop 34, which blocks the movement of the conversion element 9 in the release direction R when sliding on the guidance bars 28, 29. The stop 34 may for instance be arranged at an end of at least guidance groove 31, the end pointing in the contact direction D. Via this stop 34, forces necessary for removing the connector 1 from the counter-connector in the unlatched state may be transmitted from the gripping end 5 into the body 17 of the housing 3.

In order to connect the gripping end 5 to the conversion element 9 in a motion-transmitting manner, the gripping end 5 and the conversion element 9 can e.g. be affixed to each other. For instance, they can be fixed to each other after the conversion element 9 is placed onto the guiding element 18. The connection between the gripping end 5 and the conversion element 9 may be a latching or locking connection. Alternatively, they may be affixed to each other by a force-, form- or a material-fit, e.g. by gluing. As shown in FIG. 2, the cable 2 enters the connector 1 via its gripping end 5.

In order to assure that the conversion element 9 only interacts with the latch element 6 in order to transfer it to its unlatch position if manually activated by an operator via the gripping end 5, the connector 1 may comprise at least one resilient return means 35 for holding or automatically returning the gripping end 5 from its release position into an operating position, which may be its home position. The resilient return means 35 may be shaped as at one least one spring, which may be a pull spring that at one end may be affixed to the body 17 or the guiding element 18 and whose other end may be affixed to the gripping end 5 or to the conversion element 9. If necessary for force or stability reasons, more than one resilient return means 35 can be provided, e.g. more than one and in particular two pull springs can be used.

The latch element 6 may be formed with a slot S that extends parallel to the contact direction D and which may be closed at its end pointing against the contact direction D and towards its free end 7.

Figure 3:
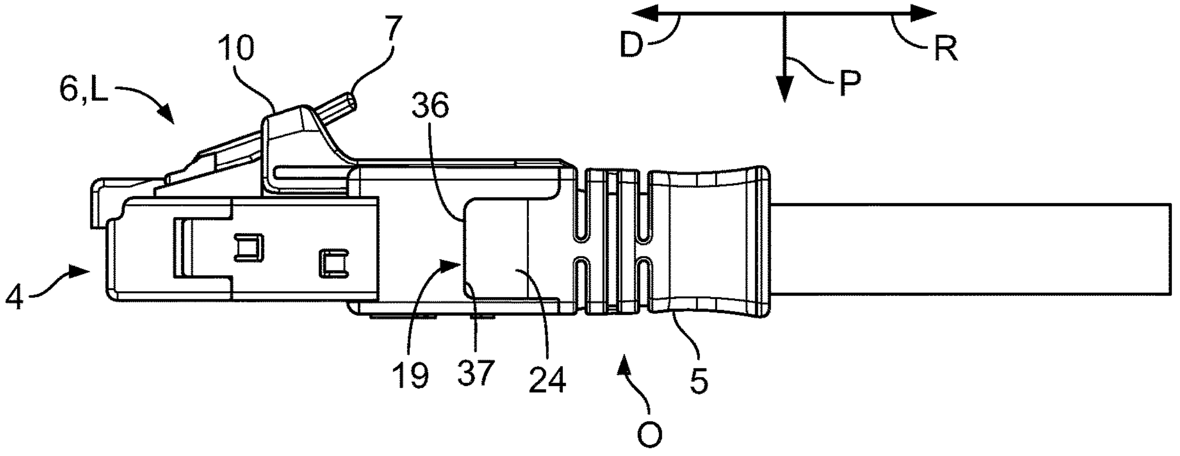
FIGS. 3-5 are schematic side views of the exemplary embodiment of FIGS. 1 and 2 in three operating states.
Figure 4:
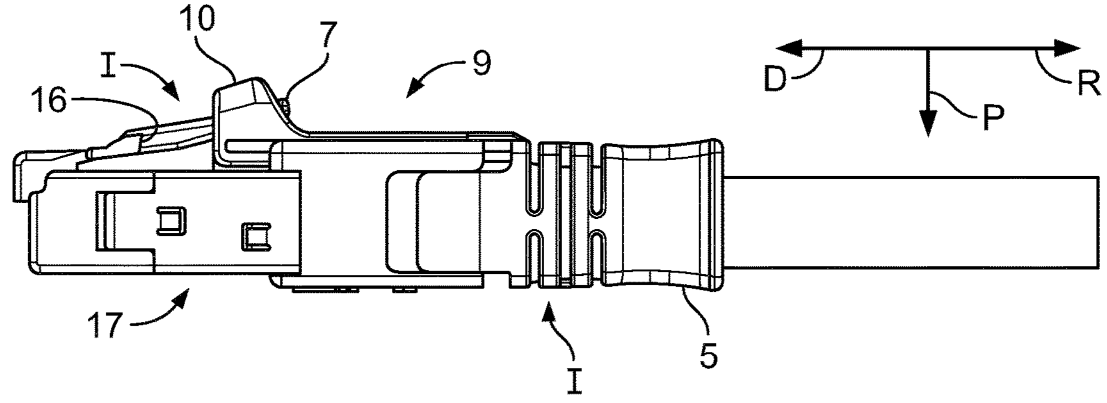
Figure 5:
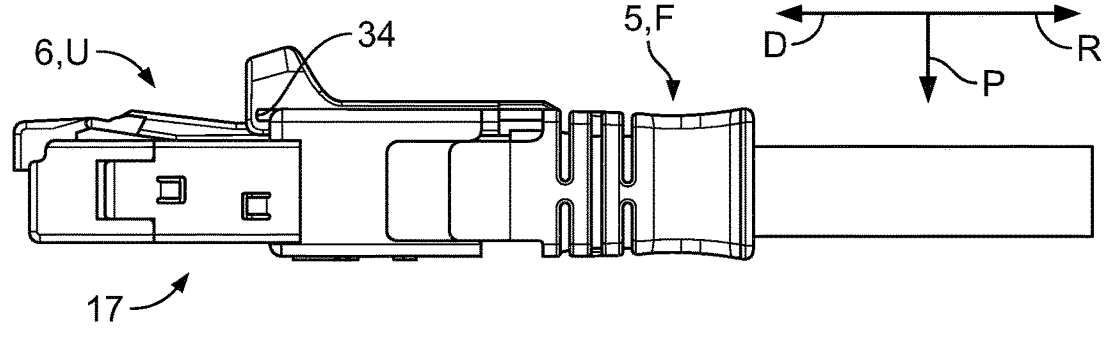

FIGS. 3-5 show the connector 1 of the embodiments of FIGS. 1 and 2 in a schematic side view, wherein the latch element 6 and the gripping end 5 are shown in different operating positions.

In FIG. 3, the latch element 6 is shown in its latch position L. The gripping end 5 is arranged in its home or operating position O, in which it is slid as far as possible towards the contact end 4. The guiding protrusion 24 is arranged in the guiding bay 19 and a front end 36 of the guiding protrusion 24 abuts against a ground 37 of the guiding bay 19. In this operating position O, the resilient return means 35 may secure the gripping end 5 against unintentional movements in the release direction R. Especially in the view of FIG. 3, it can be seen that the free end 7 of the latch element 6 protrudes above the pressing section 10 perpendicular to the contact direction D.

In FIG. 4, the gripping end 5 is shown in an intermediate position I, in which the gripping end 5 is arranged before the operating position O in the contact direction D. Together with the gripping end 5, also the conversion element 9 with its pressing section 10 is moved from the operating position O into the intermediate position I. Due to the arrangement of the free end 7 and the pressing section 10 in the operating position O as shown in FIG. 3, the pressing section 10 forces in particular the free end 7 of the latch element 6 out of the latch position L towards the housing body 17. The latch section 16 may follow the movement of the free end 7 and the amount of movement of the latch section 16 may already suffice in order to release the latch connection between the connector 1 and the counter-connector.

However, it may be necessary to force the latch element 6 further towards the housing body 17 in order to assure that the latch connection is completely released. Such an unlatch position U of the latch element 6 is shown in FIG. 5. Here, the gripping end 5 is further slid by its release motion in the release direction R with respect to the intermediate position I and is shown in its release position F. In this release position F, the latch element 6 is pressed further towards the body 17 into its unlatched position U, in which it may abut on the housing body 17.

In the unlatched position U, the latch connection with the counter-connector is released and the connector 1 can be removed from the counter-connector. Therefore, the operator can pull the gripping end 5 further in the release direction R. As soon as the stop 34 interacts with the guiding element 18, forces acting on the gripping end 5 in the release direction R may be transmitted into the housing body 17 and remove the connector 1 from the counter-connector. Hence, the latch connection between the connector 1 and the counter-connector can be released and the connector 1 can be removed from the counter-connector by a single action, this single action consisting of pulling the gripping end 5 in the release direction R.

Figure 6:
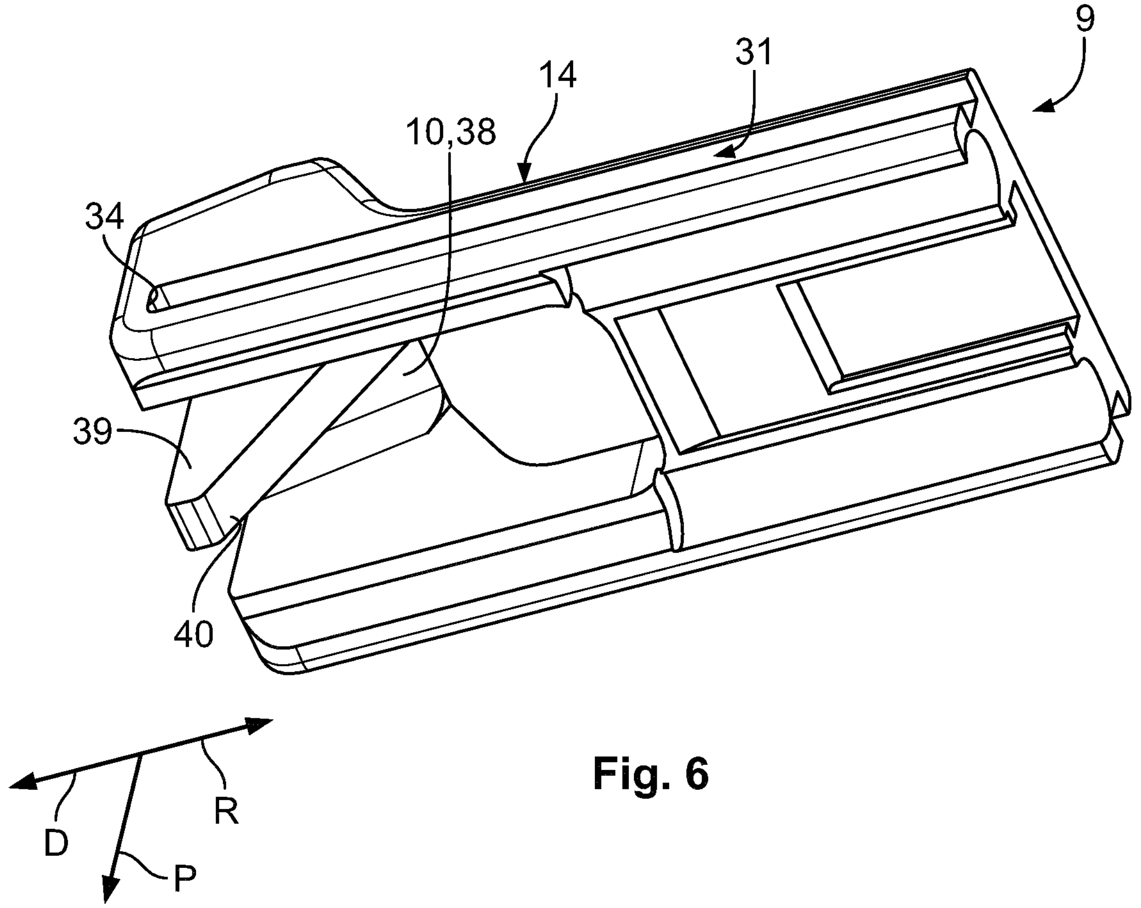
FIG. 6 is a schematic perspective view of a conversion element according to the first embodiment.

FIG. 6 shows a schematic perspective view of the conversion element 9. In FIG. 6, the conversion element 9 is shown in a view essentially against the unlatch direction P. The side of the pressing section 10 facing in the unlatch direction P may be shaped as a pressing ramp 38 and can lay against the latch element 6 in the latch position L. The pressing ramp 38 may be slanted with respect to the contact direction D or to the release direction R. It may extend towards the contact end 4 of the connector 1, thereby approaching the housing body 17. Via the pressing ramp 38, the latch element 6 can be transferred at least from the latch position L to the intermediate position I, by the release motion of the gripping end 5 and a converting motion of the conversion element 9 resulting of the release motion.

For further transferring the latch element 6 into its unlatched position U, the conversion element 9 may comprise a pressing nose 39, which may be based on the pressing ramp 38 and extend in the unlatch direction P. The pressing nose 39 may be provided with a pressing face 40, which is even more slanted with respect to the contact direction D than the pressing ramp 38. When moving the conversion element 9 from the operating position O to the intermediate position I, the pressing nose 39 may move in the slot S of the latch element 6 without interacting with the latch element 6. In the intermediate position I, the pressing face 40 may abut against an end of the slot S close to the free end 7. When further moving the gripping end 5 in the release direction R, the pressing face 40 urges the latch element 6 into the unlatch position U. In the unlatch position U, the pressing face 40 may press the latch element 6 onto the housing body 17. Forces in the release direction R acting from the pressing face 40 onto the closed end of the slot S may not only keep the latch element 6 on the body 17 but may also at least assist in removing the connector 1 from the counter-connector.

Figure 7:
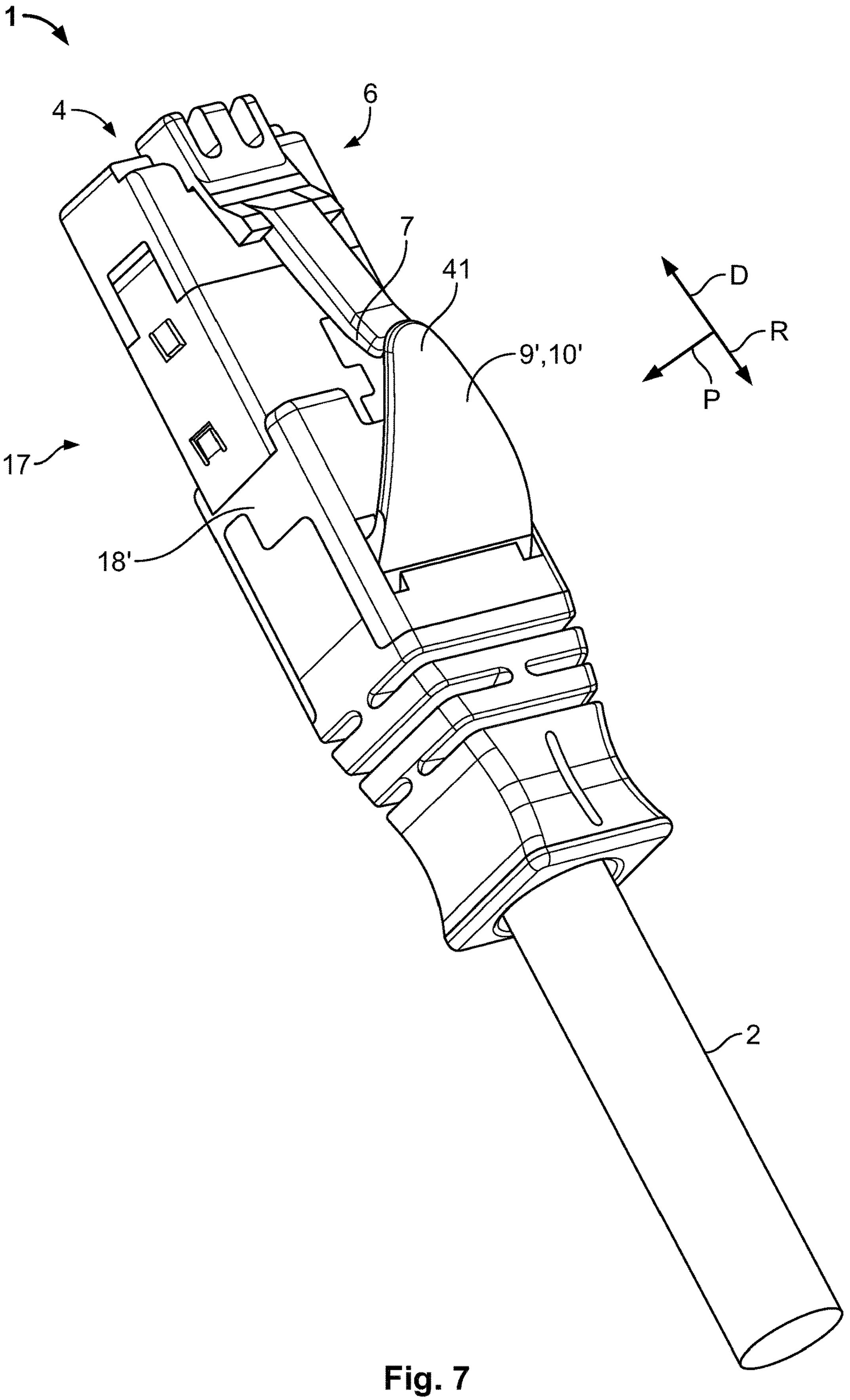
FIG. 7 is a schematic perspective view of a second exemplary embodiment of the invention.

FIG. 7 shows another exemplary embodiment of the invention in a schematic perspective view. The same reference signs are being used for elements, which correspond in function and/or structure to the elements of the exemplary embodiments of FIGS. 1-6. For the sake brevity, only the differences from the exemplary embodiment of the previous Figs. will be looked at.

FIG. 7 shows the connector 1 with a conversion element 9', which can protrude from a guiding element 18'. Only a pressing section 10' of the conversion element 9' is visible, the pressing section 10' extending away from the housing body 17 and in the contact direction D in an arc manner. The pressing section 10' may bend towards the contact end 4. At least free end 41 of the pressing section 10' may overlap the latch element 6 and in particular at least its free end 7 transverse to the contact direction D. Thus, the conversion element 9' can make sure that cables or other bodies cannot become tangled up with the latch element 6.

Figure 8:
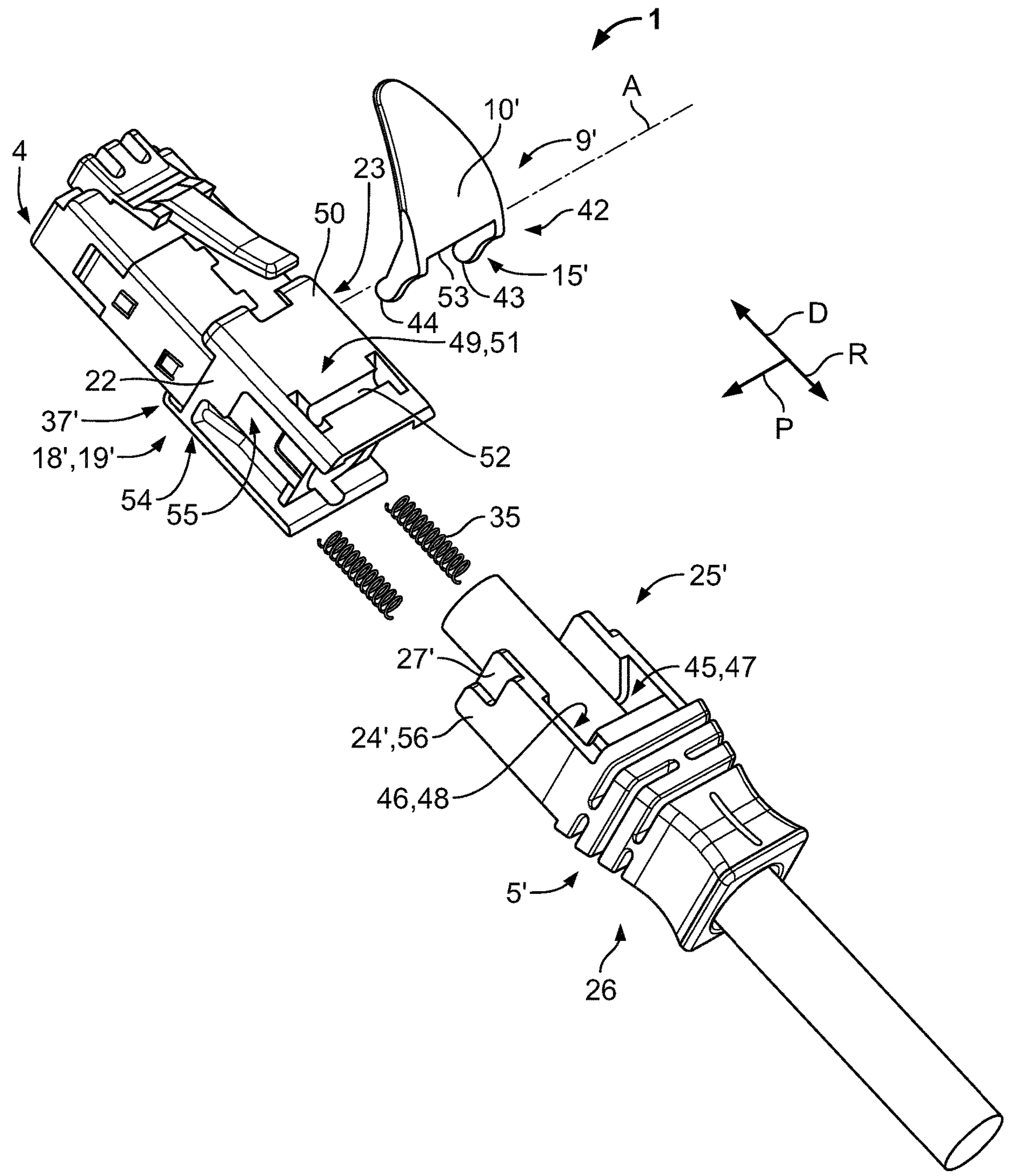
FIG. 8 is a schematic perspective exploded view of the exemplary embodiment of FIG. 7.

FIG. 8 shows the exemplary embodiment of FIG. 7 in a schematic perspective exploded view. The conversion element 9' may be shaped as a rocking lever having a kink 42, from which the pressing section 10' and a connection section 15' of the conversion element 9' may extend in different directions. The pressing section 10' and the connection section 15' may enclose an obtuse angle.

The connection section 15' may be adapted to be connected to a gripping end 5' in a motion-transmitting manner. In the case of the shown embodiment of the connector 1, the motion-transmitting manner may cause a rotatory converting motion of the conversion element 9'. The converting motion of the conversion element 9 of the exemplary embodiment shown in FIGS. 1-6 is a sliding motion.

For instance, the connection section 15' may be shaped with at least one connection leg 43, whose free end can be pulled in the release direction R by the gripping end 5'. In order to stabilise the rotatory movement of the conversion element 9', the conversion element 9' can comprise at least a second connection leg 44. The free ends of the connection legs 43, 44 can be simultaneously moved by the gripping end 5'.

For the motion-transmitting connection between the gripping end 5' and the conversion element 9', the gripping end 5' may be shaped with at least one connection recess 45, into which the connection leg 43 can at least sectionwise be inserted into the unlatch direction P. Again, more than one connection recess and in particular two connection recesses 45, 46 can be provided. The connection recesses 45, 46 can widen against the unlatch direction P towards their open insertion ends 47, 48. Such a design does not only facilitate an easy insertion of the connecting legs 43, 44 into the connection recesses 45, 46, but also enables a rotational mounting of the connection legs 43, 44 and in particular of their end pointing away from the kink 42 in the gripping end 5'.

In order to transform the translating or sliding release movement of the gripping end 5' into a rotational converting movement of the conversion element 9', the guiding element 18' may be formed with a pivot bearing 49. The pivot bearing 49 may be formed as at least one opening 51 in the side wall 50 of the guiding element 18', the side wall 50 facing against the unlatch direction P and interconnecting the side walls 22, 23. Via the opening 51, the at least one connection leg 43 can be inserted into the connection recess 45. If two connection legs 43, 44 are to be inserted, opening 51 can be larger or two openings 51 can be provided. The openings 51 may extend in the contact direction D such that the conversion elements 9' can be guided when rotating around an axis extending through e.g. the kink 42.

In order to further stabilise and guide the rotatory converting movement of the conversion element 9', the guiding element 18' can comprise a bearing groove 52, the bearing groove 52 receiving a bearing bar 53. The bearing bar 53 may be arranged in the area of the kink 42 and along a rotational axis A of the conversion element 9'. The bearing groove 52 may interconnect the openings 51.

In order to be able to press the latch element 6 out of its latch position L, the conversion element 9' can be formed dimensionally stable.

In the embodiment of FIGS. 7 and 8, the guiding element 18 is provided with at least one guiding bay 19' which is of a similar shape as the guiding bay 19. The guiding bay 19' only differs from the guiding bay 19 of the exemplary embodiment shown in FIGS. 1-6 by a ground 37', which has two ground levels in the contact direction D. Hence, the guiding bay 19' has a deeper section 54, which extends beyond a less deep section 55 of the guiding bay 19'. Similar to the embodiment of FIGS. 1-6, also the connector 1 of the shown embodiment may comprise several and in particular two guiding bays 19' that may be arranged analogue to the guiding bays 19.

The gripping end 5' may be provided with at least one guiding protrusion 24' which may at least sectionwise be shaped complementary to the guiding bay 19'. In particular, it may have a projecting section 56, which further extends in the contact direction D than the rest of the guiding protrusion 24'. A guiding plate 27' of the guiding bay 19' may be arranged next to the projecting section 56 in the contact direction D and before the projecting section 56 in the unlatch direction P. Again, similar to the first embodiment of the connector 1, two guiding protrusions 24', 25' may be provided.

When assembling the connector 1, the gripping end 5' has to be assembled with the housing body 17 and in particular with the guiding element 18' before the conversion element 9' is mounted to the guiding element 18'.

Contrary to the exemplary embodiment shown in FIGS. 1-6, no separate stop 34 is necessary. When pulling the gripping end 5' in the release direction R, the motion of the gripping end 5' is transformed into the unlatch position by the conversion element 9'. As soon as the latch element 6 has reached its unlatch position U, it blocks a further rotation of the conversion element 9'. Thus, further moving the gripping end 5' in the release direction R does not result in a further rotatory movement of the conversion element 9' but to a removal of the connector 1 from the counter-connector.

Figure 9:
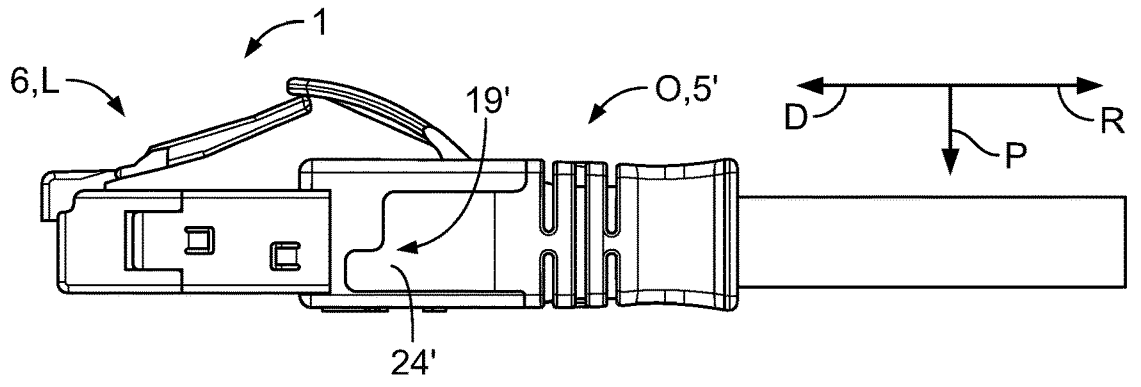
FIGS. 9-11 are schematic side views of the exemplary embodiment of FIGS. 7 and 8 in three operating states.
Figure 10:
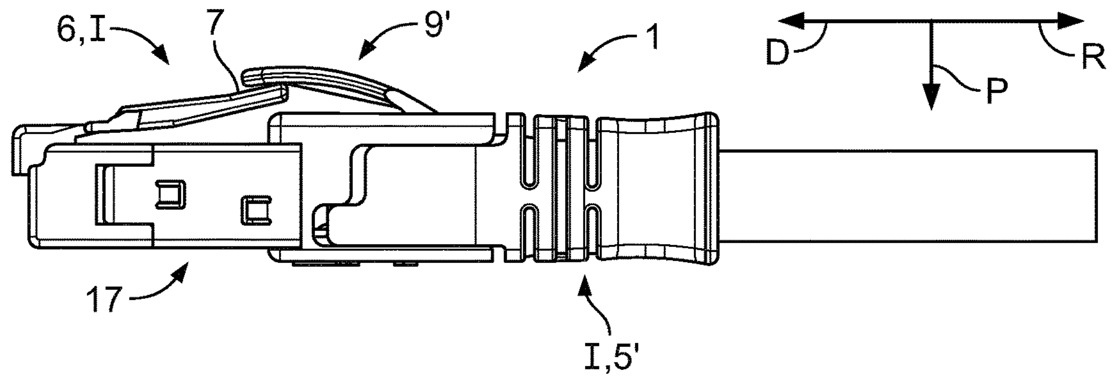
Figure 11:
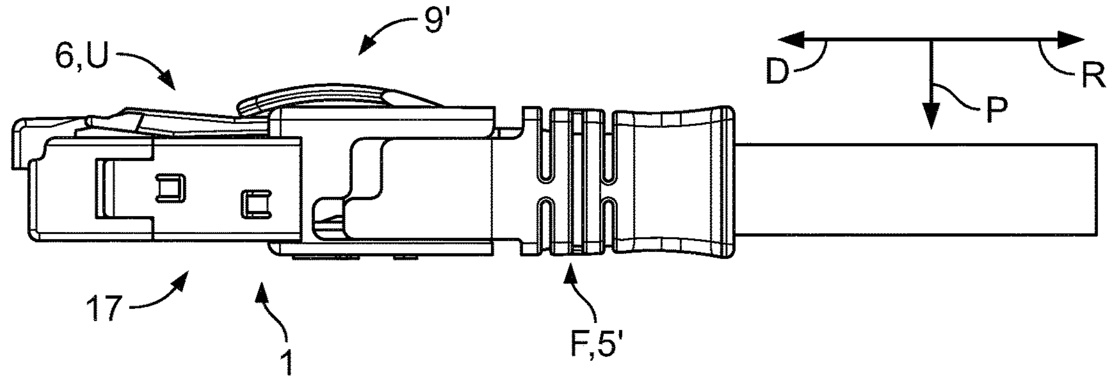

FIGS. 9-11 show the connector of FIGS. 7 and 8 in a schematic side view, wherein the figures show the connector 1 in different operating states.

FIG. 9 shows the connector 1 with a latch element 6 in its latch position L. The gripping end 5' is shown in its operating position O, in which its guiding protrusion 24' is fully inserted in the guiding bay 19'. In FIG. 10, both the latch element 6 and the gripping end 5' are shown in their intermediate positions I. The gripping end 5' is moved or slid from its operating position O in the release direction R. In this position, the gripping end 5' acts upon the conversion element 9' and moves the free ends of the connection section 15' in the release direction R. The conversion element 9' reacts upon this release motion by a rotatory converting motion and its pressing section 10' moves in the unlatch direction P. This converting motion results in a movement of the free end 7 of the latch element 6 in the unlatch direction P towards the housing body 17. In FIG. 11, the latch element 6 has reached its unlatch position U, the conversion element 9' presses the latch element 6 against the housing body 17 and cannot be further rotated. When further pulling on the gripping end 5' in the release direction R, the connector 1 will be removed from the counter-connector.

Figure 12:
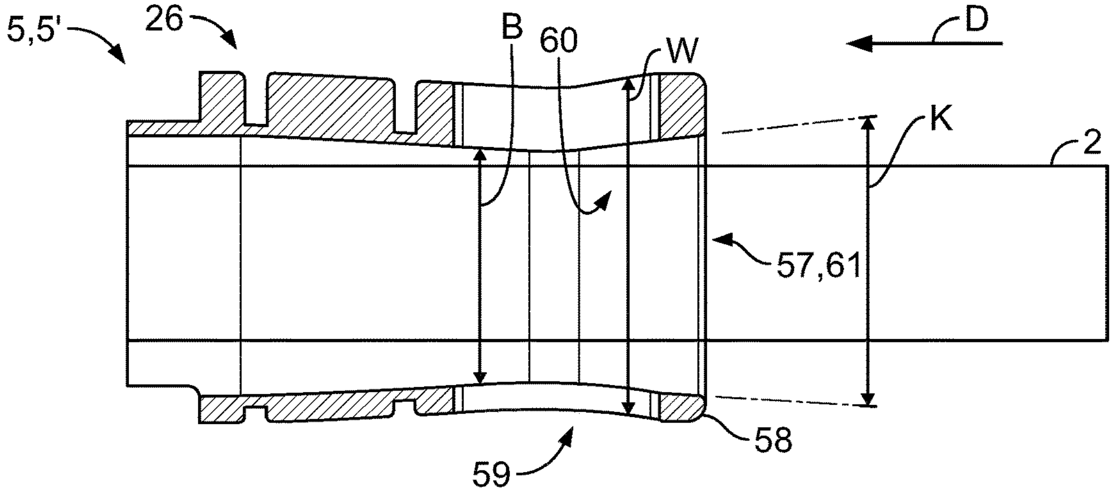
FIG. 12 is a schematic cross-sectional view of a gripping end of the connector.

FIG. 12 shows a cross-sectional view of the gripping part 26 of the end 5, 5'. A cross-sectional plane extends along the contact direction D.

Via an insertion opening 57, cable 2 enters the gripping end 5, 5'. The insertion opening 57 may be closed perpendicular to the contact direction D and may for instance have a circular footprint. An insertion end 58 may have a ring-like shape and can surround the insertion opening 57. The actuating part 26 has a width W perpendicular to the contact direction D, which may vary in the contact direction D. For instance, starting from the insertion end 58, the width W may first decrease until it reaches a minimum value and may afterwards at least sectionwise increase again. A section of the actuating part 27 with the minimal width W may be shaped as a waist 59, the waist 59 improving the contact between the fingers of the operator and the gripping end 5, 5'.

The concave outer contour of the actuating part 26 may allow for a funnel-shaped inlet section 60 of the actuating part 26, the cable 2 entering the connector 1 via the inlet section 60. The funnel-shape of the inlet section 60 eases the introduction of the cable 2 into the connector 1 and in addition avoids that the cable 2 is bent over sharp borders when the connector 1 is pivoted with respect to the cable 2.

In the contact direction D, a cable acceptance 61 follows the insertion opening 57. The cable acceptance 61 may have a tunnel-shape and may extend at least through the actuating part 26 in the contact direction D towards the contact end 4. As can be seen, an inner diameter B of the cable acceptance 61 transverse to the contact direction D is always larger than a diameter of the cable 2. Hence, the gripping end 5, 5' can easily be slid in and against the contact direction D without holding on or holding to the cable 2. The cable acceptance 61 can open into the insertion end 58 against the contact direction D and may open under an angle K, which may represent angles that are larger than 0° and smaller than 180° and which may in particular be between 5° and 20° or up to 30° or even 40°.

FIGS. 13-16 show the connector 1 according to the second exemplary embodiment with an auxiliary gripping means. The auxiliary gripping means may also be used with a connector according to the first exemplary embodiment of FIGS. 1-6. For the sake of brevity, the exemplary embodiment of FIGS. 13-16 is described with reference to the second exemplary embodiment only.

Figure 13:
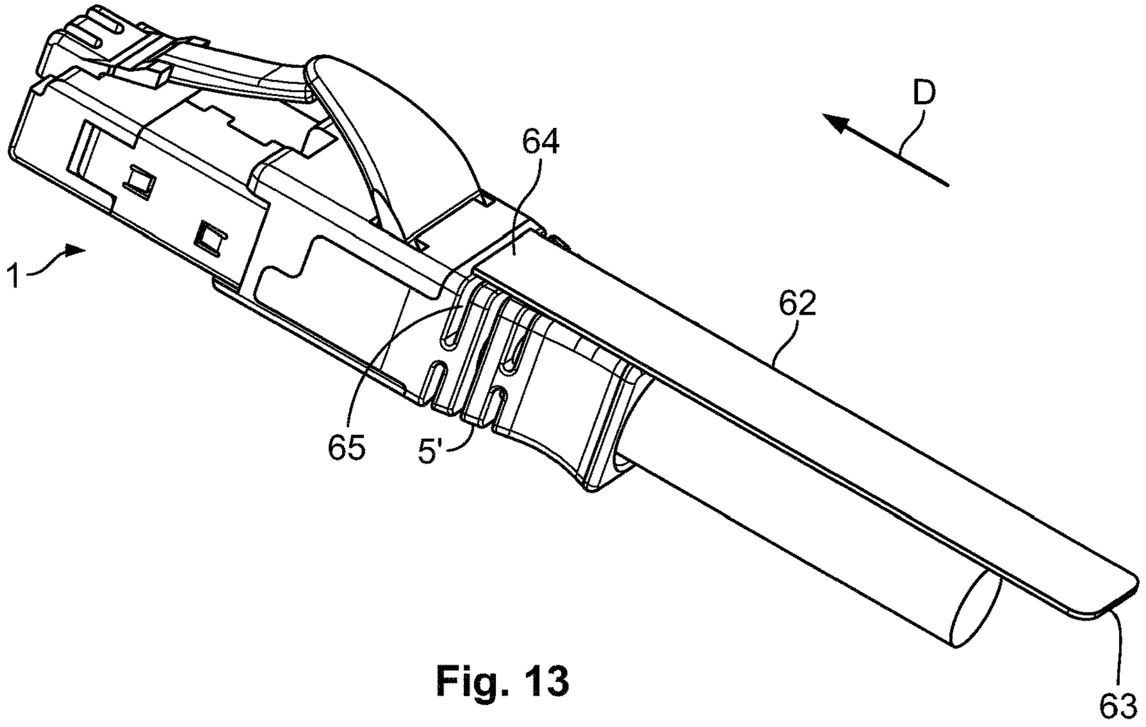
FIGS. 13-16 are schematic perspective views of the second exemplary embodiment of the invention with an auxiliary gripping means.

In the exemplary embodiment of FIG. 13, connector 1 is shown with an auxiliary gripping means 62, which is exemplarily shaped as a tongue of flap. The gripping tongue or flap may also be used as a label, which can indicate the type of connection that is established between the connector 1 and the counter-connector. Other information, e.g. IP-addresses or other data, may be shown on the gripping tongue or flap.

The tongue-like gripping means 62 may comprise a free end 63, which points against the contact direction D. The free end 63 can extend so far beyond the gripping end 5' that it can be easily read and/or gripped by the operator.

Opposite to the free end 63, the auxiliary gripping means 62 may be formed with a fixation end 64, which can be affixed to the gripping end 5' as shown in FIG. 13. For instance, the fixation end 64 may be an integral part of the gripping end 5' and may be produced together with the gripping end 5' by an injection molding process. Alternatively, the auxiliary gripping means 62 may be formed as a separate part and may be attached to the gripping end 5'. For instance, the fixation end 64 may be glued to the gripping end 5'. If the auxiliary gripping means 62 has to be connected to the gripping end 5' to be removable, it may also be connected to the gripping end 5' by a form- or force-fit. For instance, the fixation end 64 may be hooked into openings 65 in the gripping end 5'. The openings 65 may open away from the connector 1 perpendicular to the contact direction D and may increase the flexibility of the actuating part 26 such that it can bend with the cable 2.

Figure 14:
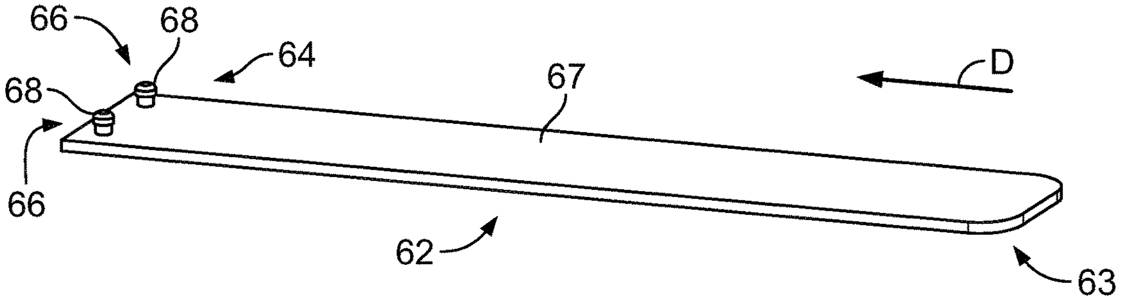

FIG. 14 shows the auxiliary gripping means 62 of FIG. 13 in a schematic perspective view. The free end 63 may comprise at least one fixation element 66, via which it can be affixed to the gripping end 5'. In the shown embodiment of FIG. 14, the gripping means 62 is shaped with two fixation elements 66, which protrude from a bottom side 67 of the tongue-shaped gripping means 62, which faces the gripping end 5' when the gripping means 62 is mounted. The fixation elements 66 extend transverse to the contact direction D and can be formed with an undercut, e.g. with a button head, at their free ends 68. The fixation elements 66 and at least their free ends 68 can be introduced in at least one opening 65 and may be pressed into the opening 65 in order to affix the gripping means 62 to the gripping end 5'.

Figure 15:
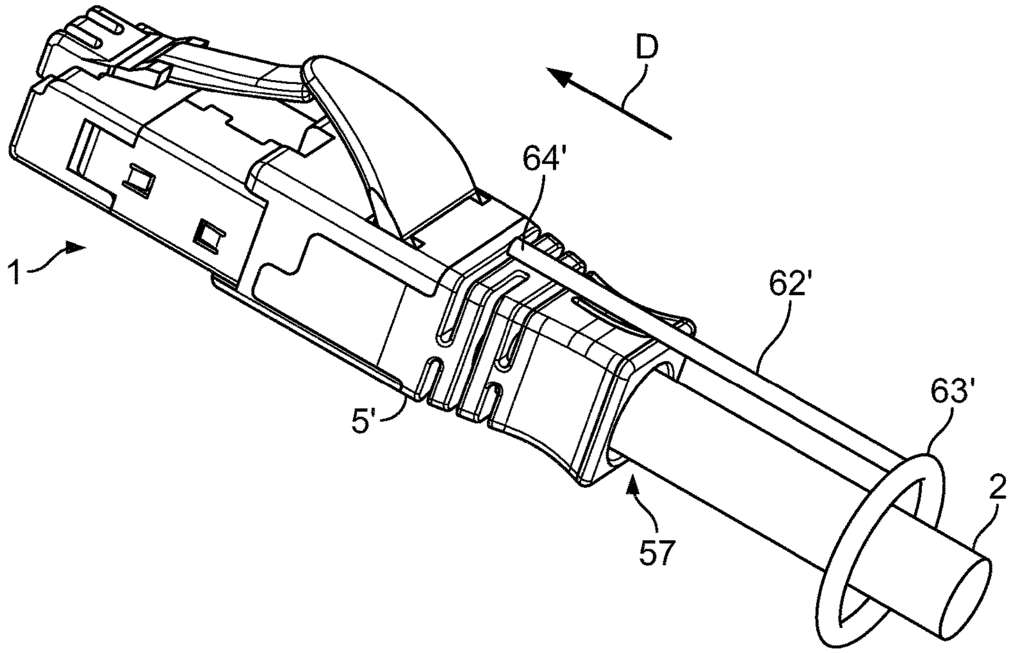

FIG. 15 shows the connector 1 with an auxiliary gripping means 62'. Again, the auxiliary gripping means 62' can be affixed to the gripping end 5' via its fixation end 64'. The fixation end 64' may comprise at least one fixation element 66 according to FIG. 14. Alternatively, the fixation end 64' may be shaped differently and may for instance be affixed to the gripping end 5', e.g. by gluing, or may be an integral part of the gripping end 5'.

Between the fixation end 64' and the free end 63', the auxiliary gripping means 62' may be shaped with a rod that extends along the contact direction D and interconnects the ends 63' and 64'. Against the contact direction D, the rod may end in the free end 63'. The free end 63' may be shaped as a cable acceptance means which assures that the cable 2 enters the connector 1 without being bent. Therefore, centre points of the free end 63' and the insertion opening 57 may be aligned along the contact direction D. In particular, the free end 63 may be shaped as a ring that is aligned perpendicular to the contact direction D and through which the cable 2 extends. Holding the cable 2 straight in the area of the connector 1 improves slidability of the gripping end 5'.

Alternatively, the auxiliary gripping means 62' and in particular the rod may at least sectionwise be flexible. Hence, the free end 63' may move with the cable 2 and relative to the contact end 4. This enables the user to select the auxiliary gripping means 62' simply by selecting the cable 2 whose connector 1 is to be disconnected.

Figure 16:
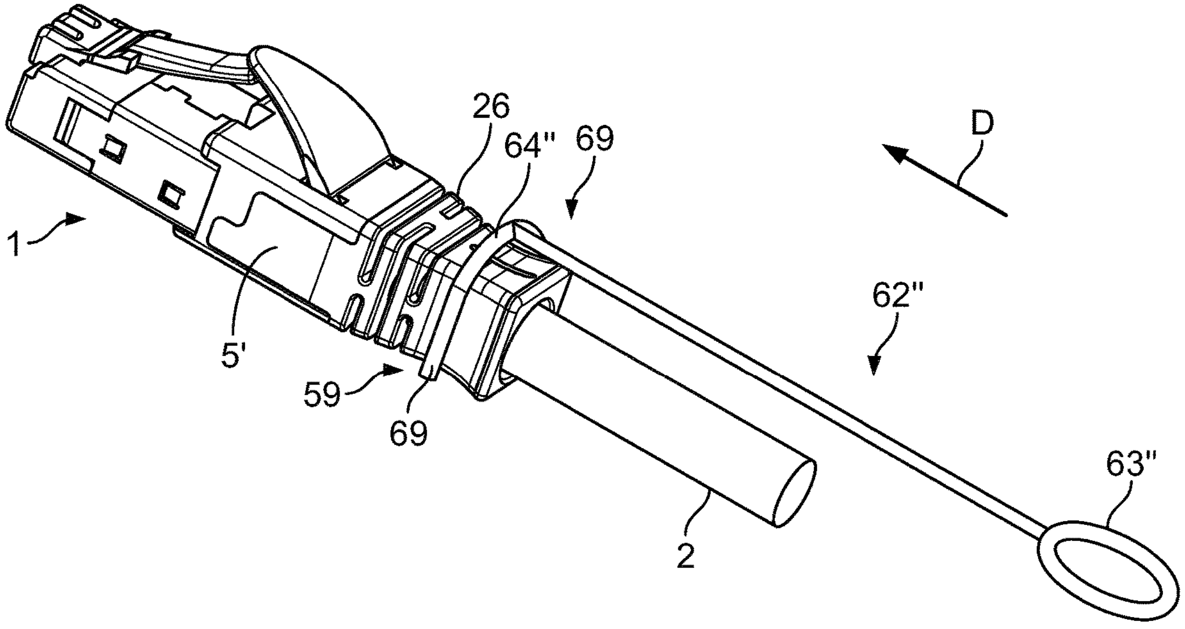

FIG. 16 shows the connector 1 with an auxiliary gripping means 62". The gripping means 62" may be formed with a fixation end 64", which can be releasably connected to the gripping end 5'. For instance, the fixation end 64" may have a U-shape, such that it is formed as a shackle. The fixation end 64" may be positioned on the gripping end 5' perpendicular to the contact direction D. A minimal distance between straight parts 69 of the U-shaped fixation end 64" may be adapted to the width W of the waist 59 of the actuating part 26.

Between the fixation end 64" and a free end 63" of the gripping means 62", the auxiliary gripping means 62" may have a rod-shape. As in the embodiment of FIG. 15, the free end 63" may have a ring-shape. In contrast to the embodiment of FIG. 15, however, the ring 63" may extend parallel to the contact direction D. Hence, the free end 63" may be used for directing the cable 2 after it has left the connector 1, still holding it straight in the area of the gripping end 5'. As the fixation end 64" of the gripping means 62" can easily be removed from the connector 1 to be attached to a further connector 1, guiding cable 2 through the free end 63" would not be useful. However, the chosen shape of the free end 63" can be easily gripped by the operator and a finger of the operator may be inserted into the ring 63" for pulling on the gripping end 5'.

The two shown embodiments of the connector 1 can intuitively be used by any operator familiar with known connectors, as the latch connection between the connector 1 and the counter-connector can not only be opened by sliding the gripping end 5, 5' but also by simply pressing the latch element 6 from its latch position L to its unlatch position U. When having a connector 1 according to the first embodiment of FIGS. 1-6, the free end 7 of the latch element 6 can directly be accessed and/or pushed in the unlatch direction P. If the connector 1 is shaped according to the second embodiment of FIGS. 7-11, the operator can simply force the pressing section 10' of the conversion element 9' towards the housing body 17, thereby displacing the latch element 6 out of its position L.

For sake of clarity, the counter-connector is not shown in any of the figures. The connector 1 can be connected to any counter-connector that can be mated with connectors of the same type as connector 1 without the improvements according to the invention.

The invention claimed is:

1. A connector for terminating a communications cable, comprising:

a contact end;

a gripping end at an opposite end of the connector from the contact end;

a housing including an end pointing in a contact direction, the housing being connectable to a counter-connector in the contact direction;

a latch extending from the housing;

a slidable member slidable relative to the housing between a first position and a second position, the slidable member defining a tunnel, a first portion of the latch being positioned within the tunnel and a second portion of the latch protruding from the tunnel towards the gripping end at least when the slidable member is in the first position, the slidable member being configured to press the latch to unlatch the connector from the counter-connector by sliding the slidable member in a direction opposite to the contact direction from the first position to the second position; and a boot connected to the slidable member and configured to act as a bend protection for the communications cable, the boot being configured to slide with the slidable member to press the latch to unlatch the connector from the counter-connector, a width of a portion of the boot decreasing as the boot extends from the gripping end towards the contact end.

2. The connector of claim 1, wherein the portion of the boot forms a waist of the boot.

3. The connector of claim 1, wherein the boot has a rectangular shape at the gripping end.

4. The connector of claim 3, wherein the boot defines a circular-shaped opening through which the communications cable extends into the boot.

5. The connector of claim 1, wherein the slidable member includes a conversion element adapted to convert a sliding motion of the slidable member into movement that presses the latch.

6. The connector of claim 5, wherein the conversion element includes a pressing nose that is received within a slot of the latch.

7. The connector of claim 6, wherein the conversion element and the slot are configured such that the slidable member can be moved from the first position to an intermediate position between the first position and the second position without the pressing nose interacting with the latch.

8. The connector of claim 5, wherein the conversion element includes a pressing ramp.

9. The connector of claim 1, wherein the slidable member is biased toward the first position.

10. The connector of claim 9, wherein the connector includes a spring that biases the slidable member toward the first position.

11. The connector of claim 9, wherein the connector includes two springs that bias the slidable member toward the first position.

12. The connector of claim 11, wherein the connector includes a stop that limits movement of the slidable member relative to the housing.

13. The connector of claim 12, wherein the stop is on the slidable member.

14. The connector of claim 1, wherein the connector is an electrical connector.

15. The connector of claim 1, wherein the connector is an RJ type electrical connector.

16. The connector of claim 1, wherein the slidable member is configured to press the latch toward the housing by sliding the slidable member from the first position to the second position.

17. The connector of claim 1, further comprising the counter-connector.

* * * * *